(12) United States Patent
Ketcham et al.

(10) Patent No.: US 8,254,516 B2
(45) Date of Patent: Aug. 28, 2012

(54) CONTROL ROD DRIVE OUTER FILTER REMOVAL TOOL

(75) Inventors: David P. Ketcham, Charlotte, NC (US); Stafford L. Turner, Ooltewah, TN (US); Robert T. Fells, Gadsden, AL (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 364 days.

(21) Appl. No.: 12/564,117

(22) Filed: Sep. 22, 2009

(65) Prior Publication Data
US 2011/0069802 A1   Mar. 24, 2011

(51) Int. Cl.
*G21C 17/00* (2006.01)
*G21C 19/00* (2006.01)
*G21C 19/42* (2006.01)

(52) U.S. Cl. ........ 376/260; 376/313; 376/271; 376/264; 376/261; 376/262; 376/268; 376/272; 414/626

(58) Field of Classification Search .......... 376/271, 376/264, 261, 262, 272, 260, 268; 3/271, 3/264, 261, 262, 272, 260, 268
See application file for complete search history.

(56) References Cited

U.S. PATENT DOCUMENTS

| | | | | |
|---|---|---|---|---|
| 2,924,483 | A | * | 2/1960 | Koch et al. ............. 294/86.4 |
| 3,212,980 | A | | 10/1965 | Kmonk et al. |
| 3,431,170 | A | | 3/1969 | Lass et al. |
| 4,452,478 | A | * | 6/1984 | Dulaney ................ 294/86.28 |
| 4,829,648 | A | | 5/1989 | Arzenti et al. |
| 5,118,465 | A | | 6/1992 | Guironnet et al. |
| 5,347,554 | A | | 9/1994 | White et al. |
| 6,773,219 | B2 | | 8/2004 | Burner |
| 6,934,350 | B1 | | 8/2005 | Challberg et al. |

* cited by examiner

*Primary Examiner* — Erin M Leach (57) ABSTRACT

An outer filter removal tool for a boiling water reactor control rod drive that uses a mechanical advantage obtained through the use of lead screw threads to pull the outer filter off of the control rod drive. Fingers on the tool are closed around the upper flange of the outer filter by sliding a collar over the outwardly biased fingers. A shaft extending through the tool is rotated which in turn extends a push plate against the control rod drive index tube causing the fingers to pull against the upper flange on the outer filter until the filter is freed from the control rod drive. The tool will hold the filter in place until affirmatively released for proper disposal.

8 Claims, 8 Drawing Sheets

CONTROL ROD DRIVE OUTER FILTER REMOVAL TOOL

BACKGROUND OF THE INVENTION

1. Field of the Invention

This invention relates generally to maintenance of a control rod drive of a boiling water reactor. Specifically, the invention relates to a tool for dismantling or assembling a portion of a control rod drive during a maintenance operation.

2. Description of the Related Art

Figure 1:
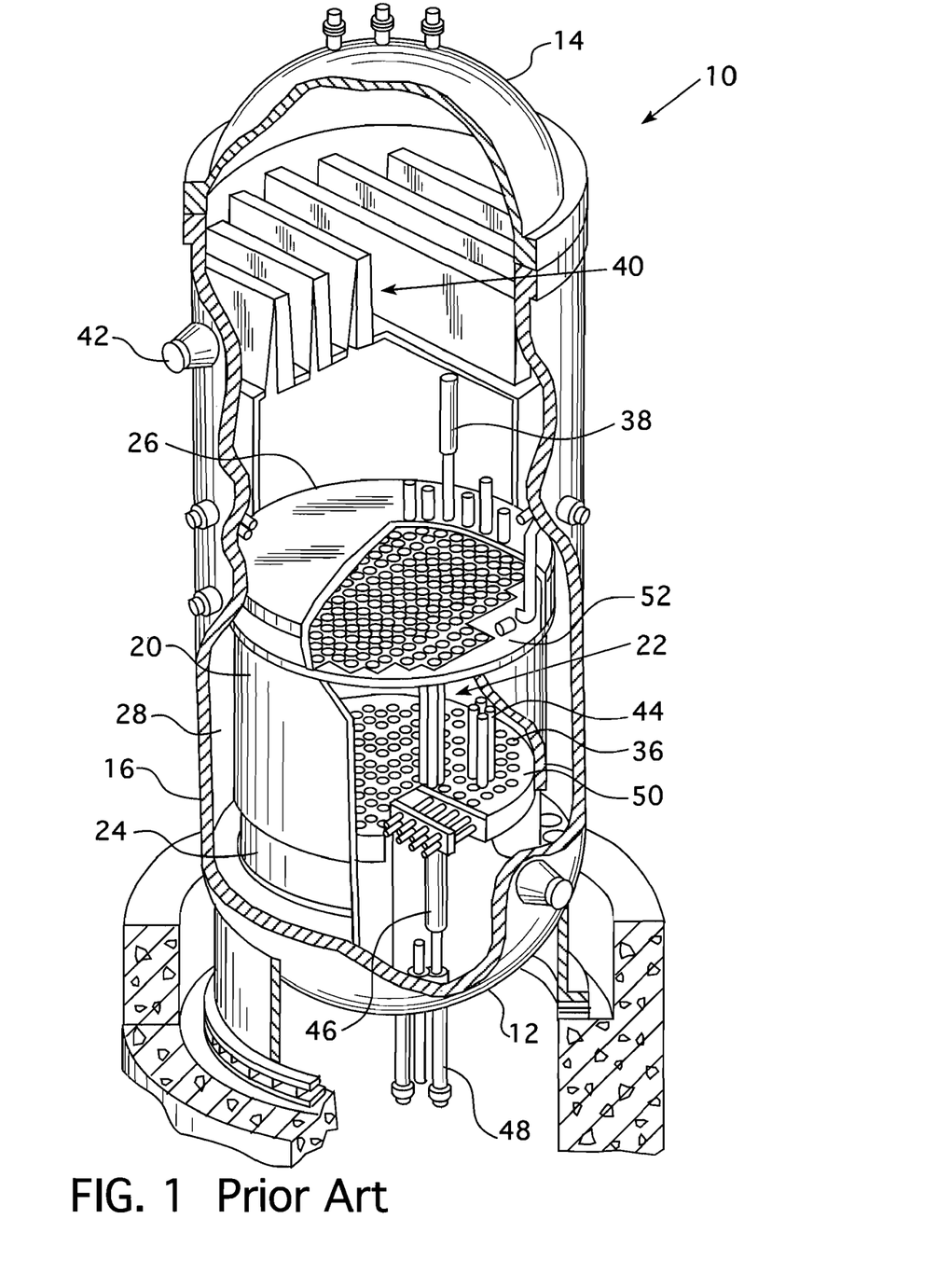
FIG. 1 is a sectional view, with parts cut away, of a boiling water nuclear reactor pressure vessel.

Control rod drives are used to position control rods in boiling water reactors to control the fission rate and fission density, and to provide adequate excess negative reactivity to shut down the reactor from any normal operating or accident condition at the most reactive time in core life. FIG. 1 is a sectional view of a boiling water nuclear reactor pressure vessel 10 with parts cut away to expose the interior thereof and illustrates the environment in which a control rod drive operates. The reactor pressure vessel 10 has a generally cylindrical shape and is closed at one end by a bottom head 12 and at its other end by a removable top head 14. A sidewall 16 extends from the bottom head 12 to the top head 14. A cylindrically shaped core shroud 20 surrounds a reactor core 22. The shroud 20 is supported at one end by a shroud support 24 and includes a removable shroud head 26 at the other end. An annulus 28 is formed between the shroud 20 and the sidewall 16 of the vessel 16.

Heat is generated within the core 22, which includes fuel bundles 36 of fissionable material. Water circulated up through the core 22 is at least partially converted to steam. Steam separators 38 separate steam from water, which is recirculated. Residual water is removed from the steam by steam dryers 40. The steam exits the reactor pressure vessel 10 through a steam outlet 42 near the vessel top head 14 and is commonly used to drive a turbine generator for the production of electricity.

The fuel bundles 36 are aligned by a lower core plate 50 located at the base of the core 22. A top guide 52 aligns the fuel bundles 36 as they are lowered into the core 22. Core plate 50 and top guide 52 are supported by the core shroud 20.

Figure 2:
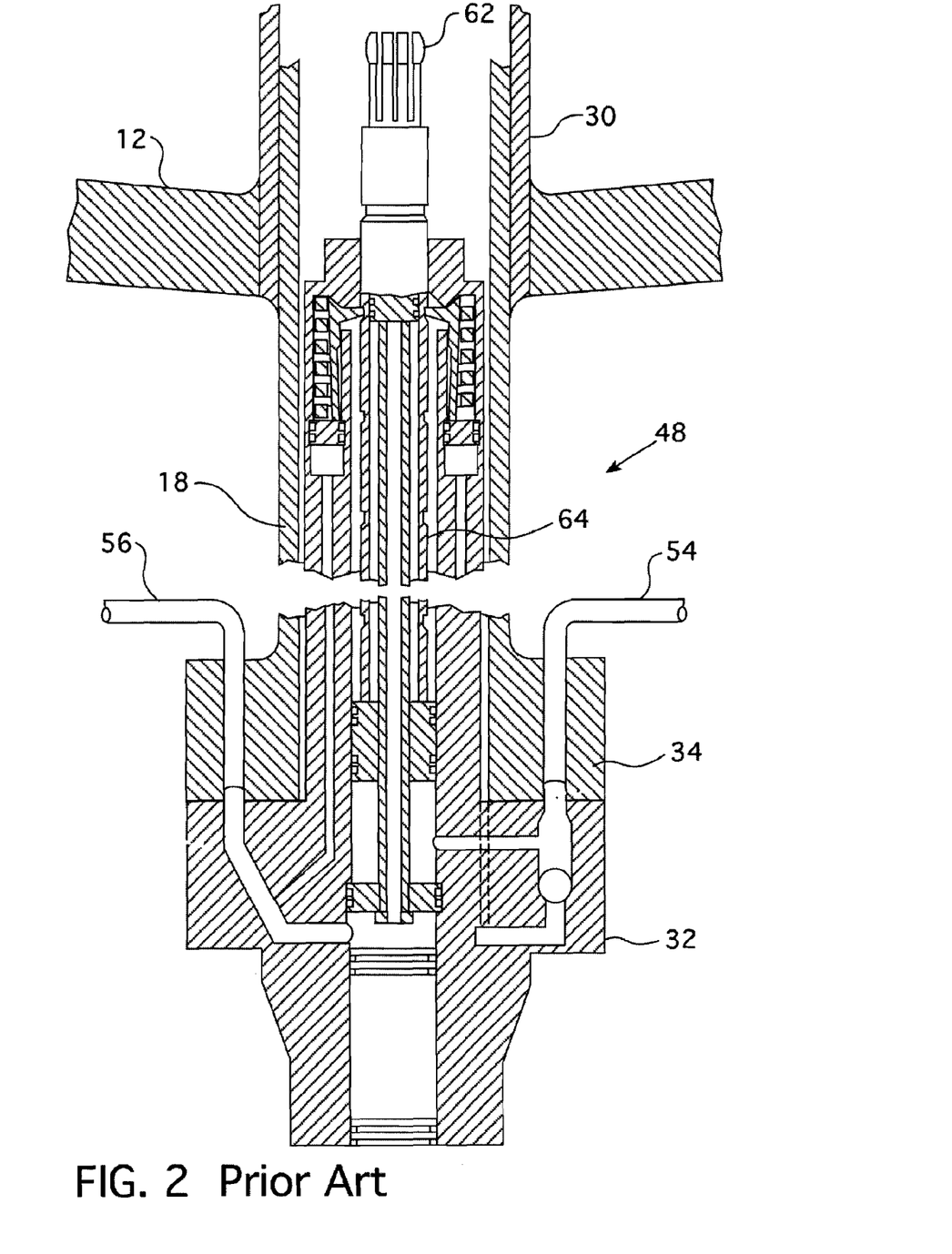
FIG. 2 is a schematic diagram partially in section of a conventional control rod drive installed in a boiling water reactor lower head.
Figure 3:
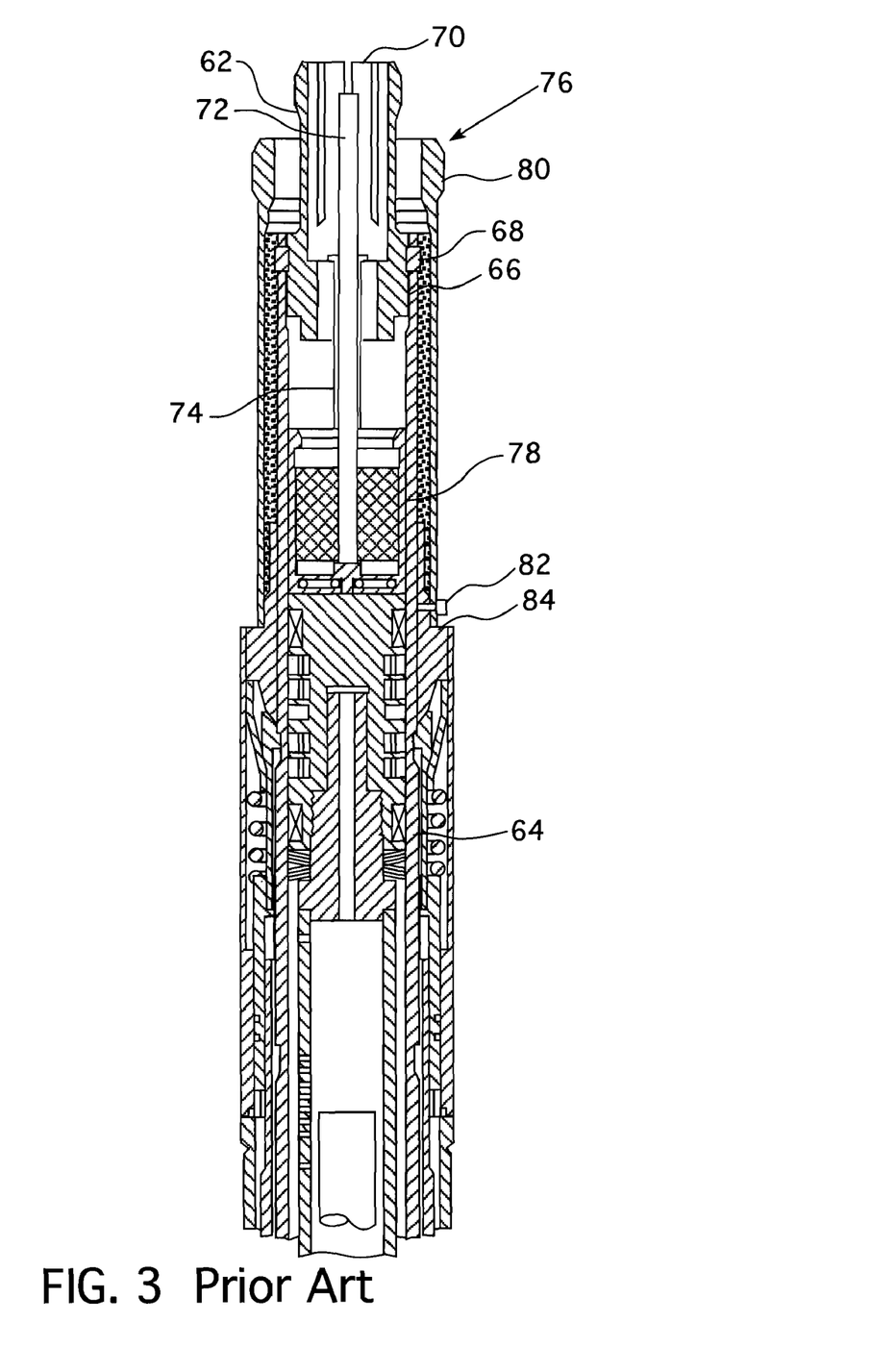
FIG. 3 is a sectional view of the upper portion of a conventional control rod drive.

The amount of heat generated in the core 22 is regulated by inserting and withdrawing control rods 44 of neutron absorbing material, such as hafnium. To the extent that the control rods 44 are inserted between the fuel bundles 36, the control rods absorb neutrons that would otherwise be available to promote the chain reaction which generates heat in the core 22. The control rod guide tubes 46 below the lower core plate 50, align the vertical motion of the control rods 44 during insertion and withdrawal. Hydraulic control rod drives 48, which extend through the bottom head 12, effect the insertion and withdrawal of the control rods 44. A better view of a control rod drive is shown in FIGS. 2 and 3. Referring to the sectional view shown in FIG. 2, each control rod drive is mounted vertically in a control rod drive housing 18 which is welded to a stud tube 30, which in turn is welded to the bottom head of the reactor vessel 12. A control rod drive flange 32 is bolted and sealed to the flange 34 of the control rod drive housing 18, which contains ports for attaching the control rod drive hydraulic system lines 54, 56. Demineralized water supplied by the control rod drive hydraulic system serves as the hydraulic fluid for effecting control rod drive operation.

As shown in FIG. 2, the control rod drive 48 is a double acting mechanically latched hydraulic cylinder. A spud 62 at the top of the index tube 64 (the moving element) engages and locks into a socket at the bottom of the control rod. Once coupled, the control rod drive and control rod form an integral unit which must be manually uncoupled by specific procedures before the control rod drive or control rod may be removed from the reactor.

As shown in FIG. 3, which provides a cross sectional view of the upper portion of a control rod drive, the spud 62, which connects the control rod to the control rod drive, is threaded onto the upper end 66 of the index tube 64 and held in place by locking band 68. Six spring fingers 70 permit the spud 62 to enter a mating socket on the control rod. A lock plug (not shown) then enters the spud from the socket and prevents uncoupling. The control rod can be uncoupled by lifting the lock plug by raising an uncoupling rod consisting of rod 72 and tube 74.

An outer filter 76 and an inner filter 78 are installed near the upper end of the control rod drive. Both are provided to filter reactor water flowing in the control rod drive to remove foreign particles or abrasive matter that could result in internal damage and excessive wear. The outer filter 76 consists of a ring with a flange 80 on its outer periphery, a perforated cylinder for supporting a woven wire filter cloth and a guide, all welded together. The outer filter 76 is installed on the control rod drive by three lock wire screws 82 which secure the lower end of the outer filter 76 to guide cap 84. The outer filter 76 removes foreign particles from reactor water entering the annulus between the control rod drive outer tube and a thermal sleeve (not shown) in the reactor vessel control rod drive housing.

Control rod drives are frequently removed from the reactor for servicing in order to maintain their reliability. During maintenance of a control rod drive, the outer filter is removed. This filter has been exposed to fields of radiation during reactor operation. Historically, long handled tongs that interact with the filter only and are pounded off with a weighted sleeve on the shaft have been used to remove the outer filter after the three filter mounting screws have been removed. Using the current tool, it is difficult to maintain a grip on the filter. Furthermore, it is difficult to hold the tool in place and operate the weighted sleeve at the same time. Furthermore, the current tool requires the operator to be in an awkward position which can lead to injury. Further, using the current tool, there is no way to create a parallel pulling force on the filter which causes binding, thus increasing removal time. The foregoing difficulties lead to a prolonged removal time which results in more radiation dose for an operator using the existing tool. While improved tools have been suggested for this purpose, such as that described in U.S. Pat. No. 5,347,554, they appear bulky, difficult to position, and do not provide a mechanical advantage to assist removing the filter.

Accordingly, a new tool is desired that is easier to handle and provides a mechanical advantage in creating an axial removal force that withdraws the outer filter from the control rod drive.

SUMMARY OF THE INVENTION

The present invention is an improved tool for removing the highly contaminated outer filter from a control rod drive during a maintenance operation. The improved outer filter removal tool has an alignment sleeve whose distal end fits within the annulus between the index tube and the outer filter. A plurality of fingers are pivotably supported from the alignment sleeve with each finger having a distal end urged outward from the sleeve by a bias spring. A collar is axially movable over at least a portion of the fingers for opposing the spring bias and urging the distal ends of the fingers towards the sleeve and over a flange on the outer filter when the alignment sleeve is positioned in the annulus between the index tube and the outer filter. A lead screw assembly, which includes an acme screw, extends axially through the tool and at least partially through the alignment sleeve and terminates in a push plate which is sized to seat on an upper portion of the index tube. The alignment sleeve is connected to a housing that surrounds a portion of the lead screw assembly and in which a portion of the lead screw assembly is rotatably supported while being axially restrained. When the acme screw is rotated it moves an internally threaded fitting axially within the alignment sleeve. The internally threaded fitting is connected to the push plate at one axial end and threaded to the acme screw through the other axial end. When the push plate is seated on the upper portion of the index tube and the lead screw assembly is turned in one direction, the push plate presses against the upper portion of the index tube while the fingers on the alignment sleeve that are clamped over the outer filter flange exert an axial force on the outer filter that is in an opposite direction to the force the push plate exerts on the index tube. This direction of rotation of the acme thread removes the outer filter from the control rod drive when the tool's fingers are clamped around the outer filter flange.

In one embodiment, the push plate is connected to an internally threaded fitting that interacts axially with the lead screw assembly. The lead screw extends from the internally threaded fitting supporting the push plate, through a bore within the alignment sleeve. The fitting is configured to be slidably received within an axial channel within an interior wall of the alignment sleeve so that when the lead screw assembly is rotated the push plate does not rotate relative to the alignment sleeve. Desirably, the lead screw assembly includes an axially extending shaft having a first end which is configured to mate with an actuation tool designed to rotate the shaft and a second end that has an external acme thread designed to mate with an internal thread on the fitting. Preferably, the push plate has tapered sides which are designed to center the push plate within a top of the index tube and the collar is biased to move axially over a portion of the fingers to close the fingers around the alignment sleeve.

In operation, the outer filter removal tool of this invention pushes the outer filter off of the control rod drive by using the mechanical advantage of the lead screw threads. The fingers are closed around the upper flange of the control rod drive outer filter by way of the sliding collar. Then the lead screw assembly extending through the tool is rotated using an air wrench or other comparable tool, which in turn pushes the push plate against the control rod drive index tube, causing the fingers to pull against the upper flange of the outer filter until the filter is freed from the control rod drive. The tool then holds the filter in place until the operator releases the filter into a proper disposal container, allowing for hands-free operation.

BRIEF DESCRIPTION OF THE DRAWINGS

A further understanding of the invention can be gained from the following description of the preferred embodiment when read in conjunction with accompanying drawings in which.

DESCRIPTION OF THE PREFERRED EMBODIMENT

Figure 4:
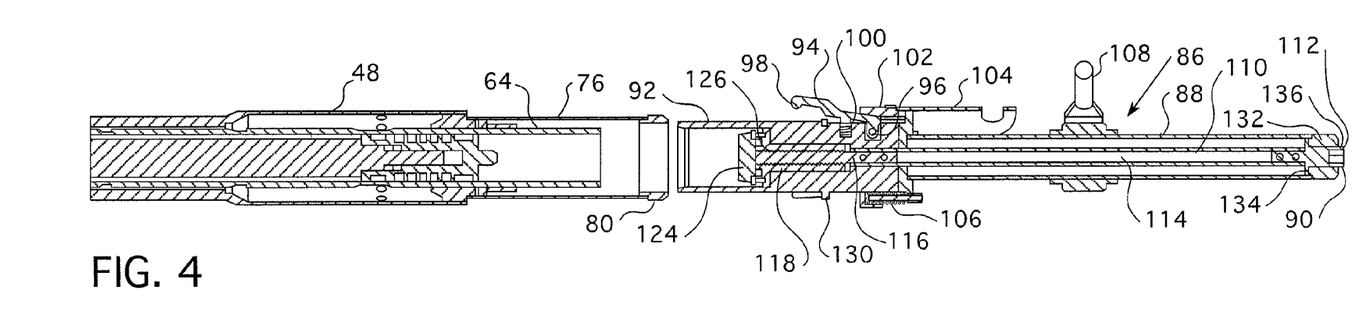
FIG. 4 is a sectional view of the improved outer filter removal tool of this invention.
Figure 5:
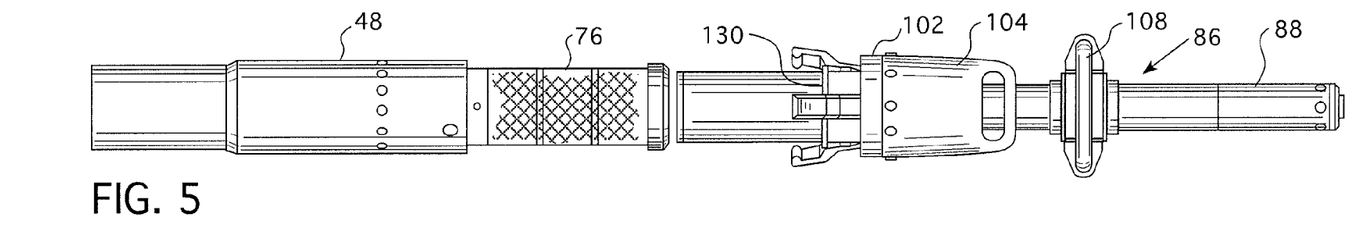
FIG. 5 is a perspective view of the tool of FIG. 4 rotated approximately 90 degrees.
Figure 6:
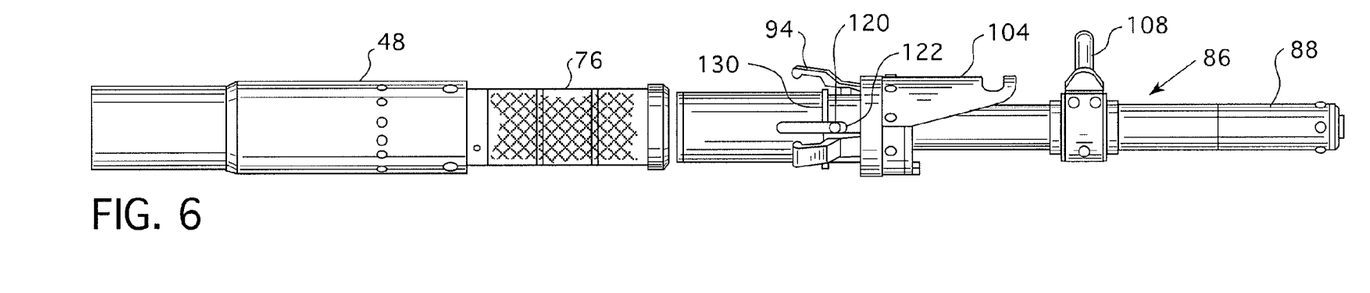
FIG. 6 is a perspective view of the tool of FIG. 4.

The improved tool of this invention 86 is shown in section in FIG. 4 and in a perspective view in FIG. 6. The tool 86 includes an elongated tubular housing 88 that extends from an open end 90 to an alignment sleeve 92 at its opposite end. The alignment sleeve has a plurality of fingers 94 that are hingedly connected to the outer surface of the alignment sleeve by the pivot pin 96 near the interface of the alignment sleeve 92 with the housing 88. Each of the fingers 94 has an inwardly projecting land 98 that is used to capture the flange 80 on the outer filter 76 which is shown laterally spaced from the tool 86 in FIG. 4. A spring 100 biases the fingers 94 in an open position pivoted away from the alignment sleeve 92. Though three fingers 94 are shown in the figures, it should be appreciated that two or more can be used, however, three are preferable. A collar 102 surrounds and is slidable axially along the alignment sleeve over the fingers 94. The travel of the collar 102 is limited by a flange welded on the end of housing 88 that also contains the pins that capture springs 106. A handle 104 extends axially from the collar towards the open end 90 of the housing 88 and is use for retracting the collar axially in the direction of the open end 90. The captive springs 106 bias the collar 102 over the fingers 94 to maintain the fingers in a closed position against the alignment sleeve when an axial force is not applied to the handle 104 in the direction of the open end 90. A flange 130 on the alignment sleeve 92 limits the distance the tool can be inserted into the control rod drive 48. A support handle 108 is fixedly attached to the housing 88 for supporting the tool when it is moved in position.

A lead screw assembly 110 is rotatably mounted and axially restrained within and extends axially through the housing 88 and partially through the alignment sleeve 92. One end of the lead screw assembly 110 extends through the open end 90 of the housing 88 and includes an articulated end such as a socket that is designed to mate with an actuation tool such as an air wrench (not shown) that is employed to rotate the lead screw assembly 110. It should be appreciated that other articulated ends such as a hex shaped land could also be used to interface with a socket on a wrench such as an air wrench. The open end 90 of the housing 88 is closed by an annular end plug 132 through which the articulated end of the lead screw assembly 110 extends. The lead screw assembly 110 is axially restrained by a flange 134 on the lead screw assembly adjacent the interior side of the end plug 132 and a captive ring 136 on the articulated end adjacent the exterior side of the end plug 132. The lead screw assembly 110 has a central shaft 114 that extends from the articulated end 112 to an acme threaded end 116. The threaded end 116 is screwed within a fitting 118 that is captured within the interior of the alignment sleeve 92 by the pins 120 which seat in the slots 122. The lower end of the lead screw assembly 110 terminates within fitting 118 which is connected to push plate 124 at a flange on the fitting. The sides of the push plate 124 are tapered to center within the opening of the index tube 64.

Figure 7:
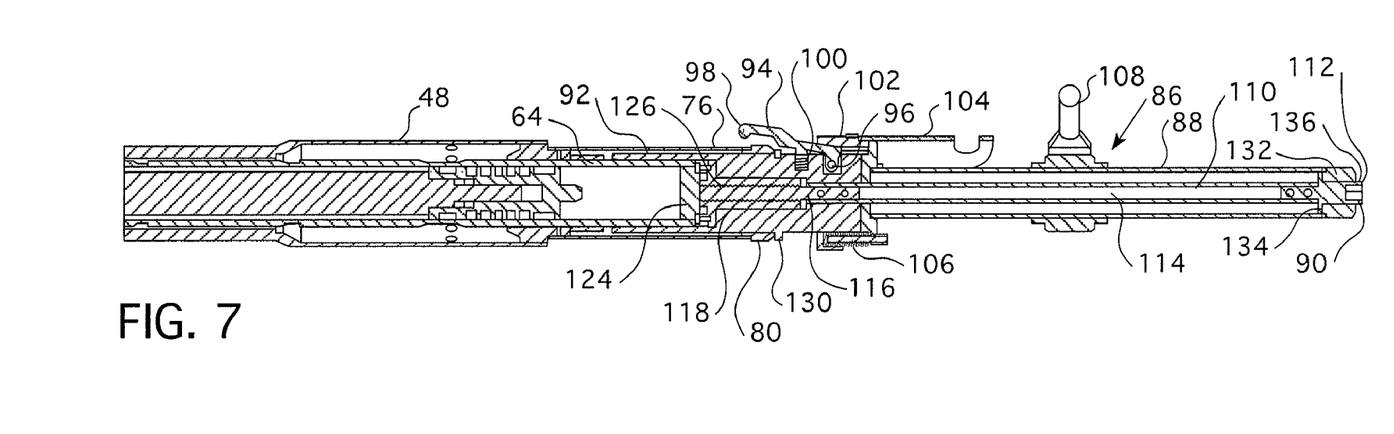
FIG. 7 is a sectional view of the tool shown in FIG. 4 with the alignment sleeve inserted between the outer filter and the index tube.
Figure 8:
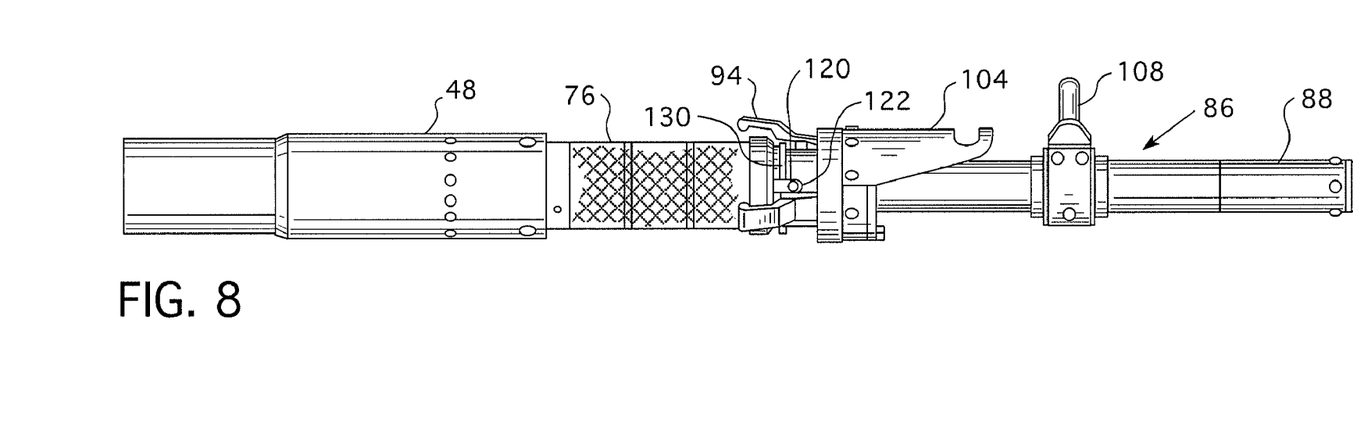
FIG. 8 is a perspective view of the tool shown in FIG. 7.
Figure 9:
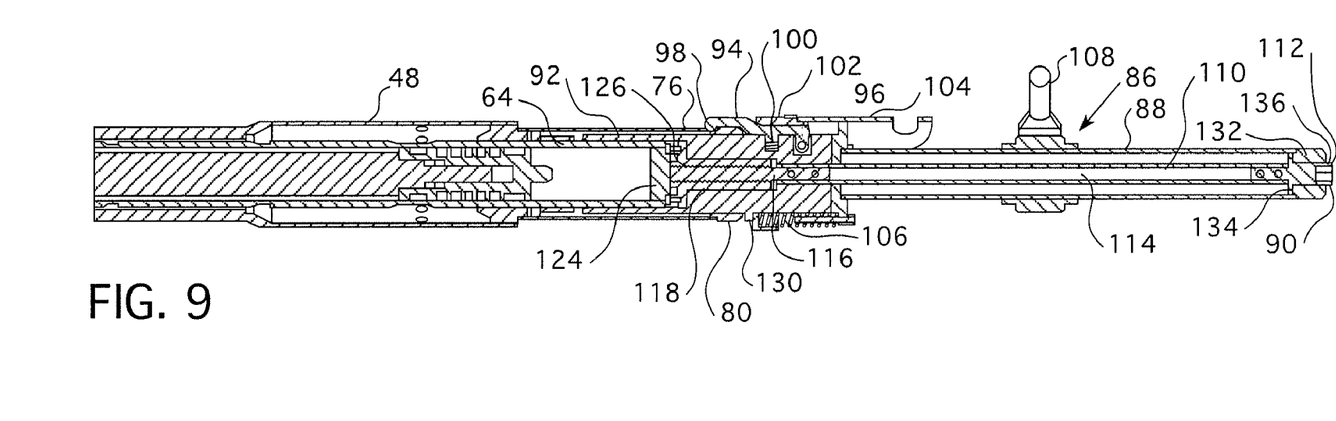
FIG. 9 is a sectional view of the tool shown in FIG. 4 with the fingers of the tool clamped on the flange of the outer filter.
Figure 10:
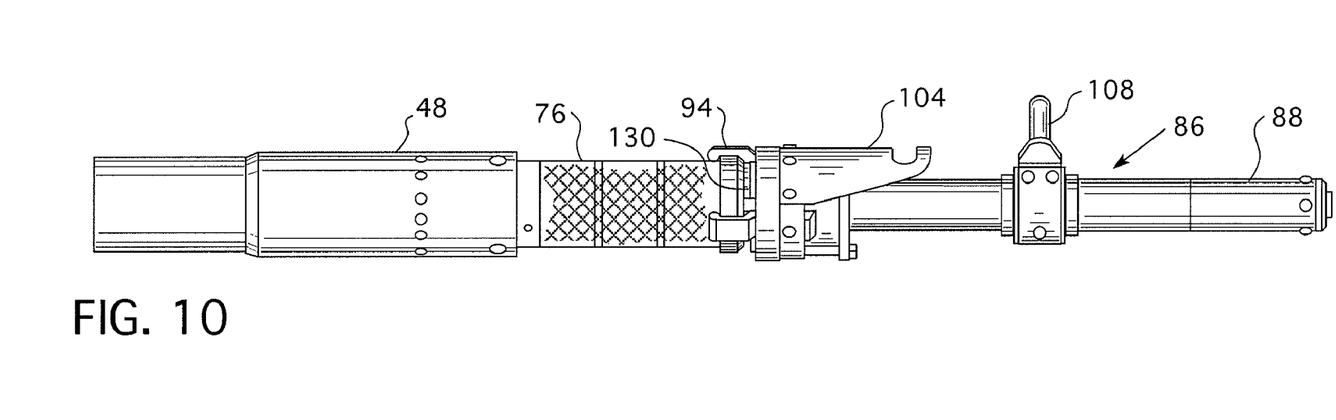
FIG. 10 is a perspective view of the tool shown in FIG. 9.
Figure 11:
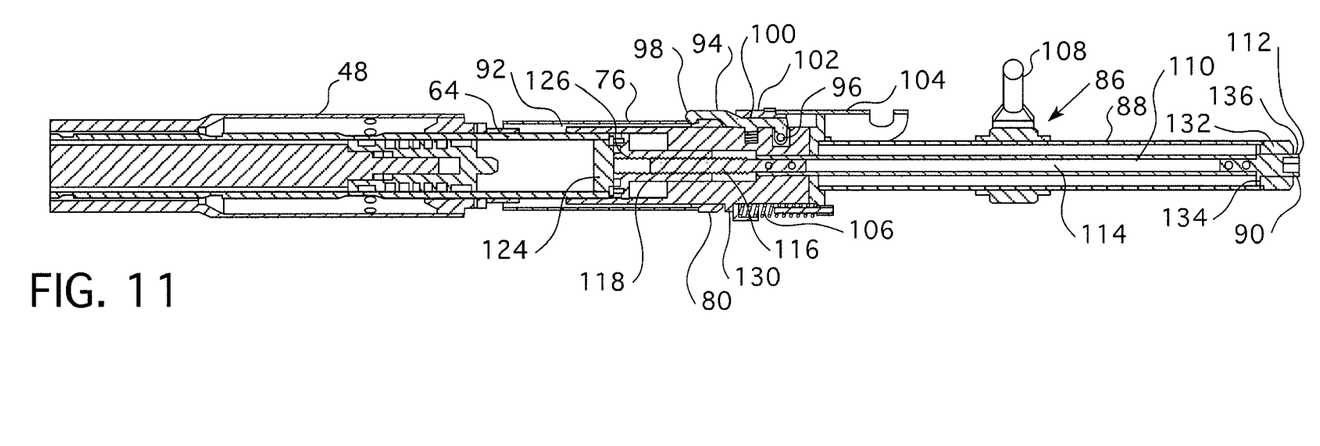
FIG. 11 is a sectional view of the tool shown in FIG. 4 with the outer filter partially removed from the control rod drive mechanism.
Figure 12:
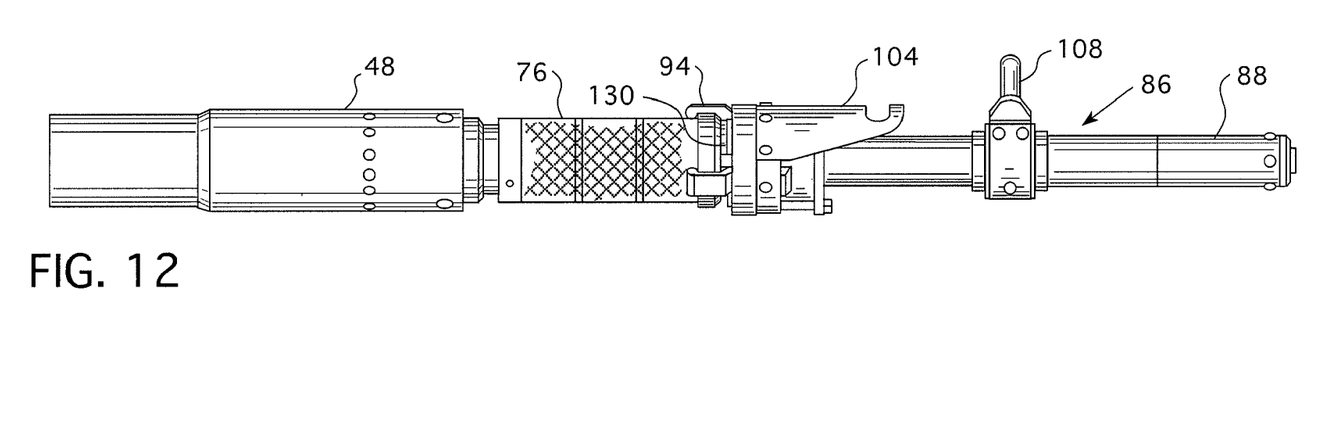
FIG. 12 is a perspective view of the tool shown in FIG. 11.
Figure 13:
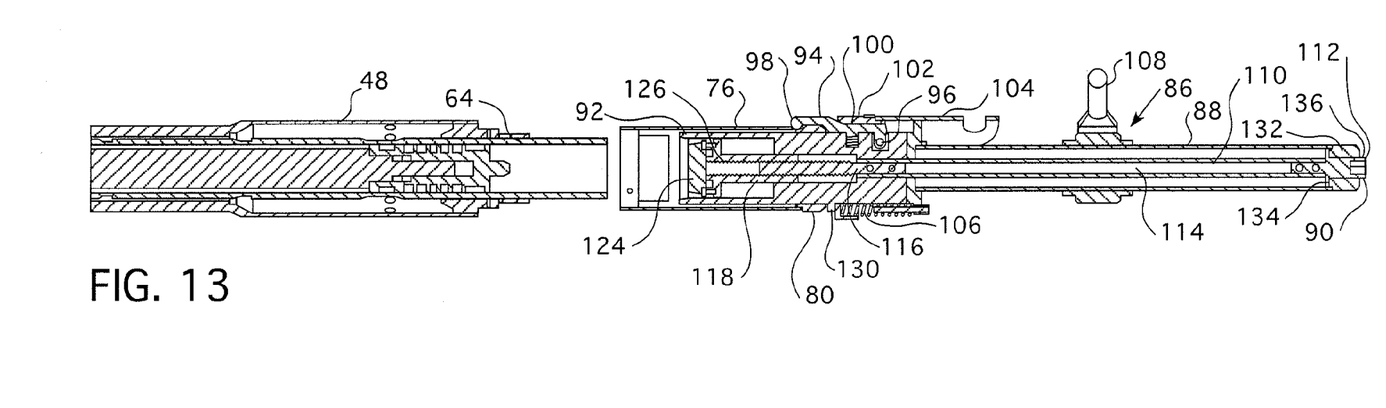
FIG. 13 is a sectional view of the tool shown in FIG. 4 with the outer filter completely removed from the control rod drive mechanism and captured by the tool's fingers.
Figure 14:
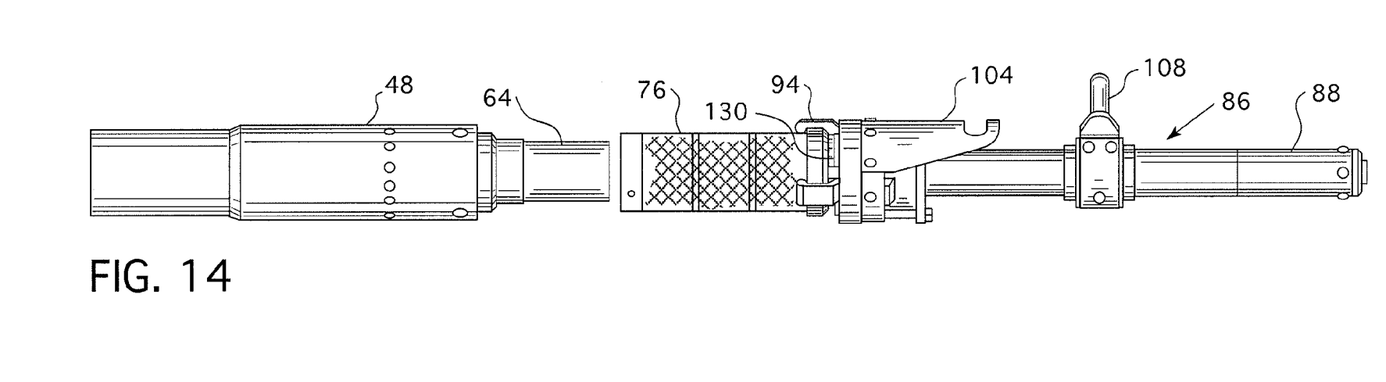
FIG. 14 is a perspective view of the tool of FIG. 13.

The operation of the tool is illustrated in FIGS. 7-14. FIG. 7 is a sectional view which shows the tool 86 positioned directly over the outer filter with the push plate 124 centered in the opening in the index tube 64. FIGS. 4-8 show the collar 104 drawn towards the handle 108. That collar position presumes that an axial force is being applied to the collar handle 104 in the direction of the housing handle 108. At rest, collar 102 is biased towards the ends of the fingers 94 to close the fingers against the outside of the alignment sleeve 92. The collar 102 is shown in the raised position so that the fingers 94 can slide over the flange 80 on the outer filter 76. However, at rest, collar 102 is held in the forward position over the fingers 94 by the captive springs 106. With the collar 102 raised and the fingers 94 biased in the open position by the springs 100, the alignment sleeve 92 of the outer filter tool 86 is then inserted into the outer filter 76 through the outer surface support flange 80 and over the index tube 64. The handle 104 is then released causing the springs 106 to extend thus pushing the collar 102 forward closing the fingers 94 behind the outer filter flange 80 and compressing the springs 100 as shown in FIGS. 9 and 10. The outer filter removal tool 86 is now held in place and aligned with the central axis of the control rod drive 48. While holding the handle 108 an air wrench is inserted into the articulated end 112 of the lead screw assembly 110. The air wrench (which is not shown) is then actuated rotating the shaft 114 and threaded end 116. The rotation of the shaft 114 and the threaded end 116 causes the fitting 118 of the push plate 124 to travel forward thus pushing the push plate 124 against the index tube 64. The forward movement of the push plate 124 causes the fingers 94 to pull against the flange 80 on the outer filter 76 thus pulling the outer filter 76 off of the control rod drive 48. The fitting 118 is kept from rotating relative to the alignment sleeve 92 by pins 120 riding in slot 122 in the alignment sleeve 92, thus limiting movement of the fitting 118 to the axial direction. FIGS. 11 and 12 show the fitting 118 moving in the direction of the control rod drive 48 as the outer filter 76 is lifted off the control rod drive 48. FIGS. 13 and 14 show the position of the internal thread 126 and fitting 118 relative to the lead screw 116 as the outer filter 76 is completely removed from the control rod drive 48. With the outer filter completely removed from the control rod drive 48, the tool 86 will hold the filter in place until the operator releases the filter into a proper disposal container, allowing for hands free operation. The tool also aligns itself with the outer filter and index tube. This eliminates any binding which has caused removal difficulties in the past.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. A boiling water reactor control rod drive mechanism tool having an axial dimension, for removing an outer filter fitting around an upper portion of a control rod drive mechanism's index tube, the outer filter and the index tube defining an annulus there between, the boiling water reactor control rod drive mechanism tool for removing the outer filter comprising:
   an alignment sleeve member having a distal end configured to fit around the index tube and into the annulus defined by the index tube and the outer filter;
   a plurality of fingers respectively, pivotally supported at circumferentially, spaced, separate locations around the alignment sleeve, each finger having a distal end urged radially outwardly from an outer surface of the sleeve by a bias spring and a range of motion generally in the radial direction between an open and closed position with both open and closed positions being substantially, radially outside of the sleeve; and
   a collar axially movable over at least a portion of the fingers for opposing the spring bias and urging the distal ends of the fingers towards the sleeve.

2. The boiling water reactor control rod drive mechanism outer filter removal tool of claim 1 including a lead screw assembly extending axially through the tool and having a threaded end portion extending at least partially through the alignment sleeve member and terminating at a push plate which is sized to push against an upper portion of the index tube of the control rod drive mechanism.

3. The boiling water reactor control rod drive mechanism outer filter removal tool of claim 2 wherein the alignment sleeve is connected to a housing that surrounds the lead screw assembly and in which the lead screw assembly is rotatably supported and axially restrained.

4. The boiling water reactor control rod drive mechanism outer filter removal tool of claim 3 wherein the push plate is connected to one end of an internally threaded fitting in which an exterior thread on the lead screw assembly is threaded into another end of the internally threaded fitting, the fitting is configured to be slidably received within an axial channel within an interior wall of the alignment sleeve and supported so that when the lead screw assembly is rotated the push plate moves axially within the alignment sleeve, but does not rotate relative to the alignment sleeve.

5. The boiling water reactor control rod drive mechanism outer filter removal tool of claim 4 wherein the lead screw assembly includes an axially extending shaft having a first end which is configured to mate with an actuation tool designed to rotate the shaft, the shaft having a second end on which the exterior thread is formed.

6. The boiling water reactor control rod drive mechanism outer filter removal tool of claim 5 wherein the outer filter has a flange and the lead screw assembly and the internally threaded fitting are configured so that when the push plate is seated on the upper portion of the index tube, the fingers are configured to close over and against the flange on the outer filter and when the lead screw assembly is turned in one direction, the push plate is configured to exert an axial force against the upper portion of the index tube.

7. The boiling water reactor control rod drive mechanism outer filter removal tool of claim 2 wherein the push plate has tapered sides to center within the upper portion of the index tube.

8. A boiling water reactor control rod drive mechanism tool having an axial dimension, for removing an outer filter fitting around an upper portion of a control rod drive mechanism's index tube, the outer filter and the index tube defining an annulus there between, the boiling water reactor control rod drive mechanism tool for removing the outer filter comprising:
   an alignment sleeve member having a distal end for fitting into the annulus defined by the index tube and the outer filter;
   a plurality of fingers supported from the alignment sleeve, each finger having a distal end urged outwardly from the sleeve by a bias spring and a range of motion generally in the radial direction between an open and closed position with both open and closed positions being outside of the sleeve; and
   a collar axially movable over at least a portion of the fingers for opposing the spring bias and urging the distal ends of the fingers towards the sleeve, wherein the collar is spring biased to move axially over at least a portion of the fingers.

* * * * *